US007283994B2

(12) United States Patent
Heusermann

(10) Patent No.: US 7,283,994 B2
(45) Date of Patent: Oct. 16, 2007

(54) MERGING OF PRODUCTS INTO A DATABASE

(75) Inventor: Knut Heusermann, Rauenberg (DE)

(73) Assignee: SAP AG, Walldorf (DE)

( * ) Notice: Subject to any disclaimer, the term of this patent is extended or adjusted under 35 U.S.C. 154(b) by 413 days.

(21) Appl. No.: 10/933,259

(22) Filed: Sep. 3, 2004

(65) Prior Publication Data
US 2005/0065945 A1    Mar. 24, 2005

Related U.S. Application Data

(60) Provisional application No. 60/503,253, filed on Sep. 15, 2003.

(51) Int. Cl.
*G06F 17/30* (2006.01)
*G06F 7/00* (2006.01)

(52) U.S. Cl. .......................................... 707/3; 707/201

(58) Field of Classification Search .................... 707/3, 707/4, 6, 10, 102, 201, 203; 711/143; 712/25
See application file for complete search history.

(56) References Cited

U.S. PATENT DOCUMENTS

| 6,088,706 A * | 7/2000 | Hild .......................... 707/202 |
| 6,275,787 B1 * | 8/2001 | Baisley ........................ 703/22 |
| 6,415,299 B1 * | 7/2002 | Baisley et al. ............... 707/203 |
| 6,748,402 B1 * | 6/2004 | Reeves et al. ............... 707/201 |
| 6,931,454 B2 * | 8/2005 | Deshpande et al. ......... 709/248 |
| 7,028,057 B1 * | 4/2006 | Vasudevan et al. ......... 707/203 |
| 7,167,860 B1 * | 1/2007 | Black et al. .................. 707/10 |
| 2003/0046280 A1 * | 3/2003 | Rotter et al. .................... 707/6 |
| 2004/0143610 A1 | 7/2004 | Engelsmann et al. |

FOREIGN PATENT DOCUMENTS

| EP | 1 271 349 A1 | 1/2003 |
| WO | WO99/24925 | 5/1999 |
| WO | WO 02/27533 A1 | 4/2002 |

OTHER PUBLICATIONS

European Search Report for EP 04 07 1903 dated Apr. 10, 2006.

* cited by examiner

*Primary Examiner*—Jeffrey Gaffin
*Assistant Examiner*—Jacques Veillard
(74) *Attorney, Agent, or Firm*—Finnegan, Henderson, Farabow, Garrett & Dunner, L.L.P.

(57) ABSTRACT

The invention relates to a method for merging data sets of a data base with data sets of a data base of a data management system. To allow merging without losing relevant data, it is proposed to determine one data set as a merging basis, match data from the data bases to identify matching data sets, create a list of matching data sets, determine data sets within the list as merging partners, and merging the merge partners with the merging basis into a single data set.

47 Claims, 3 Drawing Sheets

MERGING OF PRODUCTS INTO A DATABASE

RELATED APPLICATIONS

Applicant claims the right to priority based on U.S. Provisional Patent Application No. 60/503,253, filed Sep. 15, 2003.

DESCRIPTION OF THE INVENTION

Field of the Invention

The present invention relates to a method for merging data sets of a data base with data sets of a data base of a data management system. The invention further relates to a system for merging data sets of a data base with data sets of a data base of a data management system. The invention also relates to a computer program, computer program product, and a computer-readable medium with a computer program product stored thereon with instructions operable to cause a processor to merge data sets of a data base with data sets of a data base of a data management system. Eventually the invention relates to a data structure comprised from merging data sets of a data base with data sets of a data base of a data management system.

BACKGROUND OF THE INVENTION

In data management systems, information data of products and technical assets are stored in data sets. This holds in particular for enterprise resource planning software, like SAP R/3 or data models within master data management. Products may be comprised of data consisting of documents, document links, category assignments, collections of attributes, such as an SAP product master like extensions and sets, references and/or other links, like product relations, text elements, e.g. short texts and long texts. Within product data sets, data block may be defined. These data blocks comprise sets of product data within logically and/or systematically arranged blocks. Data block may as well be understood as data segments.

Often, data sets of different data bases have to be merged into a data base of existing data management systems. This might be the case, when two different systems are to be merged. Also, data bases of different companies might need to be merged into one data management system. It might also be necessary, to merge data of former data management systems into a data management system of a later release. This data management system of the later release may already comprise some data. The new data has to be merged with data from the former data management system without losing relevant information.

In present merging methods, there is a drawback that during importing and merging the new data, duplicates within the new data base may be created. In current systems, it is not possible to determine how two or more data sets of the same kind, e.g. of one product, may be merged into one single data set. The merging process thus faces different constraints.

SUMMARY OF THE INVENTION

The invention overcomes the above-mentioned problems by merging the data sets with the steps of determining one data set as a merging basis, matching data from the data bases to identify matching data sets, creating a list of matching data sets, determining data sets within the list as merging partners, and merging the merging partners with the merging basis into a single data set.

One advantage of the inventive method is that the resulting data set comprises all relevant data of both data bases without duplicates. Another advantage of the inventive method is that no data of any data base is lost unless it is not explicitly wanted. Data sets are only deleted, if the merging process is programmed to do so. A further advantage is that even with a plurality of duplicates of one data set these may be merged into one single data set. In the staging process, a duplicate check is carried out to determine data sets as duplicates.

The method may determine one data set of the data bases as a merging basis. The merging basis is the data set, to which the other data sets are merged to. It may also be understood as the merging destination.

The data bases are searched for matching data to identify matching sets. Matching data sets may comprise data of a certain kind, e.g. of one single product. The single product may be comprised as a data set in different data bases, and insofar should not be duplicated in the merged single data base. Some information, like the amount of available products of a certain kind, might be useful to copy or add to the merged data set.

From the identified matching data sets a list of matching data sets is created. Within this list, for each data base the matching data sets may be found.

The data sets of the list can be determined as merging partners. All data sets of the list are duplicates and should be merged. The merging partners may also be understood as merging source.

The merging partners are merged with the merging basis into a single data set. This merging allows creating one single data set out of a plurality of duplicate data sets. The measures described above may be carried out until all data sets of the data base of the data management system are merged with all respective data sets of the data base to be merged into the data management system.

A data set is preferably comprised of at least one data block comprising a defined set of product data. Within a data block, the particular data relating to the product are stored. Within one data block, different data, which correspond to each other systematically and/or logically, may be comprised. Data blocks may comprise, for instance, a "product competitor product code content" or a "product competitor product code", as used in ERP software solutions. Also, product relationships may be stored within data blocks, such as object relation administration, object-object relation, object-party relation and others. Technical assets as well as products may also be comprised within data blocks.

Within one data block different data types may be stored such as, for instance:
product set,
product-ID,
product type code,
object family code,
competitor product code,
change management,
administration,
category,
status,
description,
long text,
free attributes,
global trade item number,
unit of measure,
data,
data block
and other.

One data block may be comprised of two or more data block. The merging of data sets may be carried out on data block level. Only data within the same type of data blocks may be merged.

The matching of different data sets may be adjusted to the semantic object type of each object. The matching of different object types may be customized to the particular data model of a customer interface.

According to embodiments, determining the merging basis from the update status of the data sets is provided. Insofar, several criteria may be chosen to determine the merging basis. Other embodiments provide determining a data set as a merging basis in case it exists in the system. Insofar, once a data set is part of a data management system, it serves as merging basis.

Embodiments also provide choosing a data set as merging basis in case it has not been changed yet. After creation of the particular data set, no changes were applied to this data set. In this case this data set might be important and thus should serve as merging basis. Whether a data set has been changed may be determined from its update status.

Embodiments also provide determining a data set as a merging basis in case it is new. A new data set might be more important than an older one.

To customize the merging process, embodiments provide customizing the criteria as previously described to determine the merging basis. In this case it may be chosen which criteria are to be used first for determining the merging basis.

The relation between two data sets being duplicates might be important in order to choose the correct merging rule. Insofar, implementations provide defining merging rules, determining the process to be carried out during merging the data sets into one data set. The merging rules can represent methods to be carried out to the data sets to merge them into one data set. Merging rules may as well be defined for each type of data segment.

As there may be a plurality of relations between two data sets to be merged, merging tasks determining the status of the merging basis and the merging partner and/or their relationship to each other can be defined. Merging tasks may, for instance, be:

The data sets or products have been changed using different change orders;
The merging partner is marked to be deleted;
A data block of the merging partner is marked to be deleted;
A data block of the merging basis is marked to be deleted;
Both data sets, products have contradictory product types;
Both data sets, products have contradictory objects families;
Both data sets, products have contradictory category assignments;
Both data sets, products have a contradictory status;
Both data sets, products have different basic header data (e.g. product-ID, product-GUID, etc.);
The merging partner contains a new status;
The data set, product administration data is different;
The administration data of a specific data block within the particular data sets to be merged is different (e.g. a product master extension or set-type);
Text elements (e.g. description, long text, short text, etc.) of the same language are different within the respective data sets;
The merging partner contains text elements of new languages;
The merging partner is assigned to different (non-contradictory) product categories;
A merging partner contains a new alternative identifier of the same kind (e.g. global trade item numbers);
The merging partner contains a data block assigned to a new organisation unit, respectively a differentiation key (e.g. product master—set-types);
The merging partner contains a data block with a different data block key (e.g. product master—multiple value extensions);
An attribute of the merging partner is marked as "to be not updated";
Different values of the data sets apply for one single value attribute;
The merging partner contains a new value for the same multiple value attribute;
The merging partner contains a new product relation (e.g. to a business partner or another product);
The merging partner contains a product relation that points on itself after the merger (e.g. after the merger, product A points on itself);
An attribute of a product relation of the merging partner is different to the same attribute of the same product relation of the merging basis.

As for different merging tasks, different merging rules have to be applied embodiments provide assigning merging rules to merging tasks. Additionally the assignment of the merging rules to the merging tasks can be customized. In this case, a customer may choose how to handle different situations of merging tasks.

To handle certain merging tasks, embodiments provide merging rules comprising cancelling the merging process. The merging rules can further comprise ignoring the merging partner and continuing with the next merging partner from the list. The merging rules can also comprise remaining the merging basis unchanged. All these and other merging rules may be applied in case particular merging tasks occur. That means that for different merging tasks, different merging rules may be applied and therefore, the reaction of the process may be customized.

A further merging rule wherein a data block of the merging basis is replaced with a data block of the merging partner or a data block of the merging partner is added to the data set of the merging basis is provided.

It is further provided that the merging rules comprise removing a data block from the merging basis.

Other embodiments provide checking the update indicator of the merging basis after a merging basis is defined and product data of the merging basis is chosen. The merging of the data sets can also be cancelled in case the update indicator of the merging basis is set to "delete". In case the product update indicator points to "delete" means that this product data has to be deleted. In that case, a merging of data is no more necessary and the merging process for this merging basis may be cancelled.

Embodiments also provide choosing the product data of a merging partner, checking an update indicator of the merging partner and cancelling merging of the data sets in case the update indicator is set to "delete". In case the product update indicator of the merging partner is set to "delete", the merging process may be cancelled for that particular data set.

To merge to data sets, they have to be compatible. Therefore, embodiments provide checking a compatibility of the merging partner with the merging basis based on particular data within the data sets, and cancelling the merging of the data sets in case the data sets are incompatible. The particular data within the data sets being checked for compatibility reasons may be product type, object family, and change orders. In case the data sets are incompatible, the merging process may be cancelled for these data sets.

A further aspect of the invention is a system for merging data sets of a data base with data sets of a data base of a data management system comprising matching means for matching data from the data bases to identify matching data sets and for creating a list of matching data sets, determination means for determining one data set as a merging basis, and determining data sets within the list as merging partners, and merging means for merging the merging partners with the merging basis into a single data set.

Another aspect of the invention is a computer program and a computer program product with a computer program comprising instructions operable to cause a processor to merge data sets of a data base with data sets of a data base of a data management system with the steps of determining a data set as a merging basis, matching data from the data bases to identify matching data sets, creating a list of matching data sets, determining data sets within the list as merging partners, and merging the merging partner with the merging basis into a single data set.

Yet a further aspect of the invention is a data structure comprised from merging data sets of a data base with data sets of a data base of a data management system, wherein the data structure comprises data of a merging basis being merged with data from merging partners chosen from a list of merging partners.

Further advantages result from the dependent claims.

Referring now to the drawings, in which like numerals represent like elements throughout the several figures, aspects of the present invention and the exemplary operating environment will be described.

BRIEF DESCRIPTION OF THE DRAWINGS

In the drawings show.

DETAILED DESCRIPTION

Figure 1:
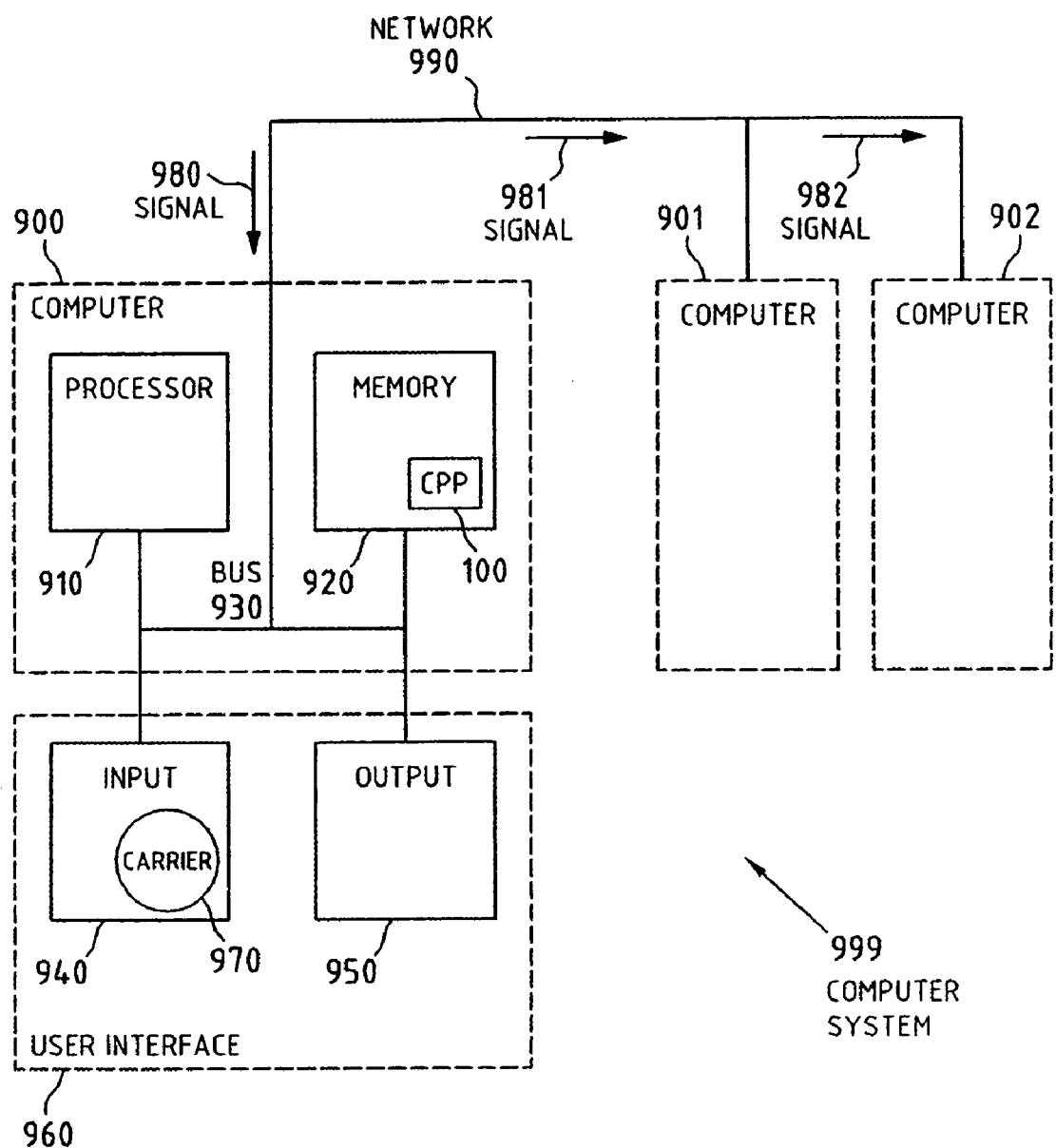
FIG. 1 a computer system.

FIG. 1 illustrates a simplified block diagram of exemplary computer system 999 having a plurality of computers 900, 901, 902 (or even more).

Preferably, the present invention is implemented by computers, within a computer network. An example is illustrated in connection with FIG. 1.

Computer 900 can communicate with computers 901 and 902 over network 990. Computer 900 has processor 910, memory 920, bus 930, and, optionally, input device 940 and output device 950 (I/O devices, user interface 960). As illustrated, the invention is implemented by computer program product 100 (CPP), carrier 970 and signal 980.

In respect to computer 900, computer 901/902 is sometimes referred to as "remote computer", computer 901/902 is, for example, a server, a peer device or other common network node, and typically has many or all of the elements described relative to computer 900.

Computer 900 is, for example, a conventional personal computer (PC), a desktop device or a hand-held device, a multiprocessor computer, a pen computer, a microprocessor-based or programmable consumer electronics device, a minicomputer, a mainframe computer, a personal mobile computing device, a mobile phone, a portable or stationary personal computer, a palmtop computer or the like.

Processor 910 is, for example, a central processing unit (CPU), a micro-controller unit (MCU), digital signal processor (DSP), or the like.

Memory 920 is elements that temporarily or permanently store data and instructions. Although memory 920 is illustrated as part of computer 900, memory can also be implemented in network 990, in computers 901/902 and in processor 910 itself (e.g., cache, register), or elsewhere. Memory 920 can be a read only memory (ROM), a random access memory (RAM), or a memory with other access options. Memory 920 is physically implemented by computer-readable media, for example: (a) magnetic media, like a hard disk, a floppy disk, or other magnetic disk, a tape, a cassette tape; (b) optical media, like optical disk (CD-ROM, digital versatile disk—DVD); (c) semiconductor media, like DRAM, SRAM, EPROM, EEPROM, memory stick.

Optionally, memory 920 is distributed. Portions of memory 920 can be removable or non-removable. For reading from media and for writing in media, computer 900 uses well-known devices, for example, disk drives, or tape drives.

Memory 920 stores modules such as, for example, a basic input output system (BIOS), an operating system (OS), a program library, a compiler, an interpreter, and a text-processing tool. Modules are commercially available and can be installed on computer 900. For simplicity, these modules are not illustrated.

CPP 100 has program instructions and—optionally—data that cause processor 910 to execute method steps of the present invention. In other words, CPP 100 can control the operation of computer 900 and its interaction in network system 999 so that is operates to perform in accordance with the invention. For example and without the intention to be limiting, CPP 100 can be available as source code in any programming language, and as object code ("binary code") in a compiled form.

Although CPP 100 is illustrated as being stored in memory 920, CPP 100 can be located elsewhere. CPP 100 can also be embodied in carrier 970.

Carrier 970 is illustrated outside computer 900. For communicating CPP 100 to computer 900, carrier 970 is conveniently inserted into input device 940. Carrier 970 is implemented as any computer readable medium, such as a medium largely explained above (cf. memory 920). Generally, carrier 970 is an article of manufacture having a computer readable medium with computer readable program code to cause the computer to perform methods of the present invention. Further, signal 980 can also embody computer program product 100.

Having described CPP 100, carrier 970, and signal 980 in connection with computer 900 is convenient. Optionally, further carriers and further signals embody computer program products (CPP) to be executed by further processors in computers 901 and 902.

Input device 940 provides data and instructions for processing by computer 900. Device 940 can be a keyboard, a pointing device (e.g., mouse, trackball, cursor direction keys), microphone, joystick, game pad, scanner, or disc drive. Although the examples are devices with human interaction, device 940 can also be a device without human interaction, for example, a wireless receiver (e.g., with satellite dish or terrestrial antenna), a sensor (e.g., a thermometer), a counter (e.g., a goods counter in a factory). Input device 940 can serve to read carrier 970.

Output device 950 presents instructions and data that have been processed. For example, this can be a monitor or a display, (cathode ray tube (CRT), flat panel display, liquid crystal display (LCD), speaker, printer, plotter, vibration alert device. Output device 950 can communicate with the user, but it can also communicate with further computers.

Input device 940 and output device 950 can be combined to a single device. Any device 940 and 950 can be provided optional.

Bus 930 and network 990 provide logical and physical connections by conveying instruction and data signals. While connections inside computer 900 are conveniently referred to as "bus 930", connections between computers 900-902 are referred to as "network 990". Optionally, network 990 includes gateways which are computers that specialize in data transmission and protocol conversion.

Devices 940 and 950 are coupled to computer 900 by bus 930 (as illustrated) or by network 990 (optional). While the signals inside computer 900 are mostly electrical signals, the signals in network are electrical, electromagnetic, optical or wireless (radio) signals.

Networks are commonplace in offices, enterprise-wide computer networks, intranets and the Internet (e.g., world wide web WWW). Network 990 can be a wired or a wireless network. To name a few network implementations, network 990 can be, for example, a local area network (LAN), a wide area network (WAN), a public switched telephone network (PSTN); a Integrated Services Digital Network (ISDN), an infra-red (IR) link, a radio link, like Universal Mobile Telecommunications System (UMTS), Global System for Mobile Communication (GSM), Code Division Multiple Access (CDMA), or satellite link.

A variety of transmission protocols, data formats and conventions is known, for example, as transmission control protocol/internet protocol (TCP/IP), hypertext transfer protocol (HTTP), secure HTTP, wireless application protocol (WAP), unique resource locator (URL), a unique resource identifier (URI), hypertext markup language (HTML), extensible markup language (XML), extensible hypertext markup language (XHTML), wireless markup language (WML), Standard Generalized Markup Language (SGML).

Interfaces coupled between the elements are also well known in the art. For simplicity, interfaces are not illustrated. An interface can be, for example, a serial port interface, a parallel port interface, a game port, a universal serial bus (USB) interface, an internal or external modem, a video adapter, or a sound card.

Computer and program are closely related. As used hereinafter, phrases, such as "the computer provides" and "the program provides", are convenient abbreviation to express actions by a computer that is controlled by a program.

Figure 2:
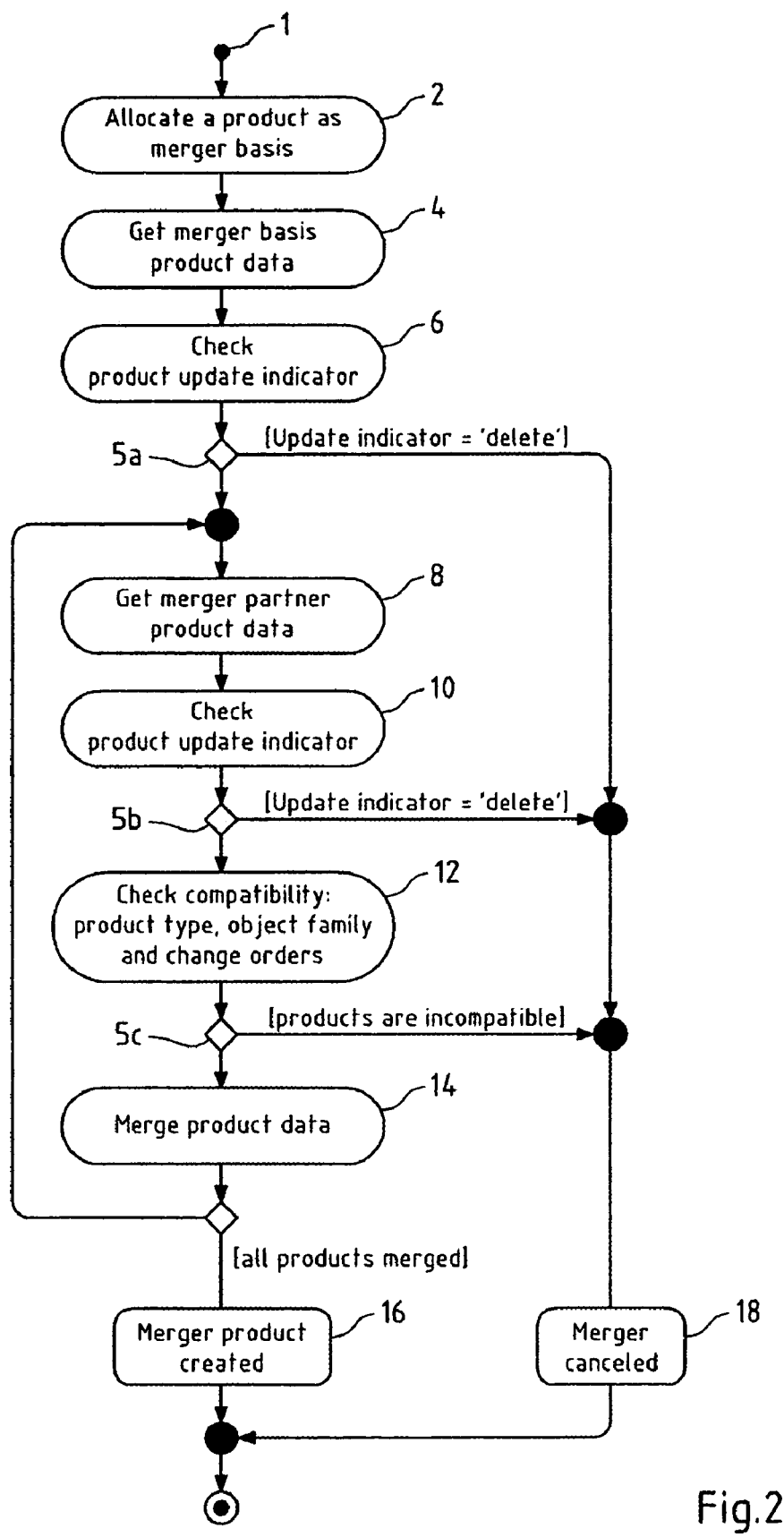
FIG. 2 a flow chart of an inventive method.

FIG. 2 depicts a flow chart of an inventive method. First, the data bases to be merged are selected 1. This may be data bases of a data management system within different versions, e.g. one data base is older than the other. Both data management systems may comprise data sets, e.g. representing products or technical assets. The product or the technical asset may be a set of data consisting of:

documents, category assignments, collection of attributes, like SAP product masters, extensions and sets, references and/or other links, like SAP product masters, product relations, or text elements, like short text and long text.

Each product may be defined by data blocks, defining a set of particular product data, for instance relating to each other systematically and/or logically.

After selecting 1 respective data bases, a certain product (data set) is selected as merging basis 2. The merging basis may be selected based on the following criteria:

The product exists in the current system and has not been changed;

The product exists in the current system;

the product is new.

The order of these criteria may be changed via system customizing. From the selected merging basis, product data is extracted 4.

After the merging basis is selected 2 and the product data is extracted 4, a product update indicator is checked 6. The product update indicator determines the status of a product data set. The product update indicator may be new, delete, copy, changed or any other status information. In case the product update indicator indicates "delete" 5a, the merging process may be cancelled 18, as the product data set is to be deleted anyway. In case the product update indicator does not indicate delete, a merging partner product data is retrieved from the data base to be merged 8.

Prior to step 8, a list of merging partners may be created. This may be done by matching data from the respective data bases to identify matching data sets. Matching data sets may be duplicates, comprising the same product-ID, the same product, or any other duplicate information.

After the merging partner product data is retrieved 8, a product update indicator of this product data is checked 10. Again, as in step 6, it is checked whether an update indicator is set to delete. In case the merging partner product data is to be deleted 5b, the merging process may also be cancelled 18.

In case the product update indicator does not indicate "delete", the compatibility of the data sets to be merged is checked 12. The merging might only be reasonable if product update indicators are not set to delete, and the products are compatible for merging. Therefore, product types and object families as well as change orders of product data of the merging basis and the merging partner are checked. The result of this check 12 may be used to determine if the data sets of the products, e.g. the products themselves, are compatible or not and may be merged or not 5c. In case products are not compatible, the merging process may be cancelled 18.

In case the products are compatible, both products data may be merged into one single data set 14. When merging both data sets, the following data of the merging basis may be kept unchanged:

Generic product data (COM_PRODUCT), status of the product and/or of the data set, administration data, short text and long text of a single language, short and long text of a new language of the merging partner may be merged into the merging result, amount units (set-type COMM_PR_UNIT)—in case of basic amount units the amounts units of the merging partner are added to the amount units of the merging basis, common product-GTIN (set-type COMM_PR_GTIN), common-GTIN of the merging partner is taken as additional GTIN, product categories, product categories of the merging partner will be added in case this category in the same hierarchy is non-existent, all set-types and extensions of the merging partner, which may not be allocated within the merging basis, may not be added to the merged data set.

For single attributes, the value of the attribute of the merging basis may be overwritten by the respective attribute value of the merging partner. In case of multiple value attributes, the attribute value of the merging partner may be added to the attribute values of the merging basis. Categories, extension and set-types, which update indicator is set to delete, may be ignored and not used for the merged data set.

Product relations may be adapted, such that a product identifier may be replaced by the identifier of the merged data set. Also, the product relation may be set to "obsolete" in case source and destination, or source and destination product of the relation are identical.

After step 14, a new merging partner of the list may be chosen and merging, steps 8-14, may be repeated. In case all products are merged, the merger product is created 16 and the merging process is ended.

Figure 3:
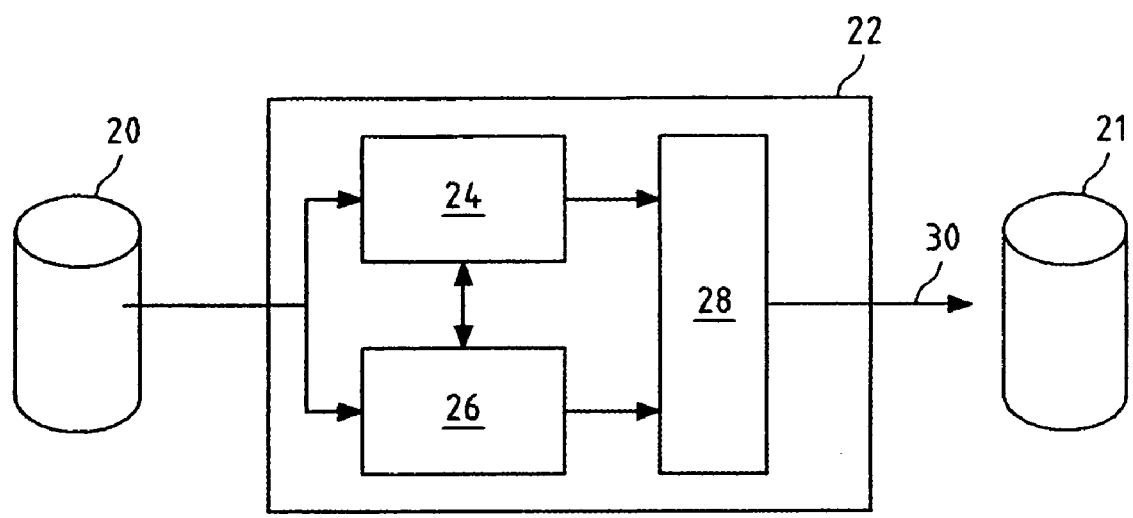
FIG. 3 an inventive system.

FIG. 3 depicts a system according to the invention. Depicted is a plurality of data bases 20, each comprising data sets. Further depicted is a computer system 22 comprising determination means 24, matching means 26 and merging means 28. Also depicted is a destination data base 21, where the merged data sets are to be stored.

To merge data sets of different data bases 20 the data sets are fed to the computer system 22. The inbound data sets are fed to matching means 26 and determination means 24. Within matching means 26, data sets from the data bases are checked whether matching data sets occur. In case matching data sets occur a list of these matching data sets is created. The items in the list correspond to the merging basis, which is determined within determination means 24.

Within determination means 24, one data set of the data bases is determined as merging basis. All remaining data sets within the list may be determined as merging partners. The result of the matching means 26 and determination means 24 may be fed to merging means 28.

Within merging means 28, the merging basis is used for merging data of the merging partners. Data from merging basis and data from merging partners are merged into one single data set, based on certain rules, which have already been previously described. After all data sets, which are matching have been merged, the resulting single data set is put out 30 into one single data base 21. The system 22 merges all data sets within the respective data bases so that all data of the data bases 20 may be merged into one single data base 21.

By using the inventive method and the inventive system, as well as the inventive computer program and computer product, computer-readable medium or data structure, it is possible to merge data sets of different data bases and data management systems into new data sets so that the resulting data sets comprise all relevant data of the merged data bases.

What is claimed is:

1. A computer-implemented method for merging data sets of a first data base with data sets of a second data base of a data management system, the method comprising:
   identifying a data set as a merging basis;
   matching data from the first and second data bases to identify a matching data set, wherein the matching data set can be used to identify a merging partner;
   determining whether the merging partner and the merging basis are compatible; and
   merging the merging partners with the merging basis into a single data set based on the compatibility of the merging partner and the merging basis, wherein the single data set can be accessed by a user.

2. The method of claim 1, wherein the data set includes at least one data block comprising a defined set of product data.

3. The method of claim 1, wherein identifying the data set as the merging basis based on an update status of the data sets of the first and second data bases.

4. The method of claim 3, wherein identifying the data set as the merging basis if the data set exists in the system.

5. The method of claim 4, wherein a identifying the data set as the merging basis if the data set has not been changed.

6. The method of claim 3, wherein identifying the data set as the merging basis if the data set is new.

7. The method of claim 1, further comprising customizing the criteria for identifying the merging basis.

8. The method of claim 1, further comprising defining one or more merging rules that determine the process to be carried out during merging the data sets into one data set.

9. The method of claim 1, further comprising defining one or more merging tasks that determine a status of the merging basis and the merging partner and a relationship of the merging basis and the merging partner to each other.

10. The method of claim 1, further comprising assigning one or more merging rules to one or more merging tasks.

11. The method of claim 10, further comprising customizing the assignment of the merging rules to the merging tasks.

12. The method of claim 1, further comprising:
    defining one or more merging tasks;
    determining the status of the merging basis and the merging partner and a relationship of the merging basis and the merging partner to each other;
    assigning one or more merging rules to one or more merging tasks; and
    merging the merging partner with the merging basis according to the assignment of one or more merging rules to the one or more merging tasks into a single data set.

13. The method of claim 12, wherein the merging rules comprise cancelling the merging process.

14. The method of claim 12, wherein the merging rules comprise ignoring the merging partner and continuing with the next merging partner from the list.

15. The method of claim 12, wherein the merging rules comprise not altering the merging basis.

16. The method of claim 12, wherein the merging rules comprise replacing a data block of the merging basis with a data block of the merging partner or adding a data block of the merging partner to the data set of the merging basis.

17. The method of claim 12, wherein the merging rules comprise removing a data block from the merging basis.

18. The method of claim 1, further comprising checking an update indicator of the merging basis, wherein the merging of the data sets is cancelled if the update indicator is set to delete.

19. The method of claim 1, further comprising checking an update indicator of the merging partner, wherein the merging of the data sets is cancelled if the update indicator is set to delete.

20. The method of claim 1, further comprising checking the compatibility of the merging partner with the merging basis based on particular data within the data sets, wherein the merging of the data sets is cancelled if the data sets are incompatible.

21. The method of claim 1, further comprising defining one or more merging tasks that determine the status of the merging basis and the merging partner or the relationship of the merging basis and the merging partner to each other.

22. The method of claim 1, further comprising:
defining one or more merging tasks;
determining the status of the merging basis and the merging partner or the relationship of the merging basis and the merging partner to each other;
assigning one or more merging rules to one or more merging tasks; and
merging the merging partner with the merging basis according to the assignment of one or more merging rules to the one or more merging tasks into a single data set.

23. The method of claim 1, wherein the determination of the compatibility of the merging partner and the merging basis can involve the product types, the object families, or the change orders of the merging partner and the merging basis.

24. A computer program product including instructions that cause a computer, when executed, to provide a method for merging data sets of a first data base with data sets of a second data base of a data management system, the method comprising:
identifying a data set as a merging basis;
matching data from the first and second data bases to identify a matching data set, wherein the matching data set can be used to identify a merging partner;
determining whether the merging partner and the merging basis are compatible; and
merging the merging partners with the merging basis into a single data set based on the compatibility of the merging partner and the merging basis, wherein the single data set can be accessed by a user.

25. The computer program product of claim 24, comprising instructions operable to cause a processor to identify the data set as the merging basis based on an update status of the data sets of the first and second data bases.

26. The computer program product of claim 24, comprising instructions operable to cause a processor to identify the data set as the merging basis if the data set exists in the system.

27. The computer program product of claim 24, comprising instructions operable to cause a processor to identify the data set as the merging basis if the data set has not been changed.

28. The computer program product of claim 24, comprising instructions operable to cause a processor to identify the data set as the merging basis if the data set is new.

29. The computer program product of claim 24, comprising instructions operable to cause a processor to customize the criteria for identifying the merging basis.

30. The computer program product of claim 24, comprising instructions operable to cause a processor to define merging rules determining the process to be carried out during merging the data sets into one data set.

31. The computer program product of claim 24, comprising instructions operable to cause a processor to define merging tasks determining a status of the merging basis and the merging partner and a relationship of the merging basis and the merging partner to each other.

32. The computer program product of claim 24, comprising instructions operable to cause a processor to assign one or more merging rules to one or more merging tasks.

33. The computer program product of claim 24, comprising instructions operable to cause a processor to customize the assignment of the merging rules to the merging tasks.

34. The computer program product of claim 24, comprising instructions operable to cause a processor to:
define one or more merging tasks determining a status of the merging basis and the merging partner and a relationship of the merging basis and the merging partner to each other,
assign one or more merging rules to one or more merging tasks, and
merge the merging partner with the merging basis according to the assignment of one or more merging rules to one or more merging tasks into a single data set.

35. The computer program product of claim 24, comprising instructions operable to cause a processor to cancel the merging process according to merging rules.

36. The computer program product of claim 24, comprising instructions operable to cause a processor to ignore the merging partner and continuing with the next merging partner from the list according to merging rules.

37. The computer program product of claim 24, comprising instructions operable to cause a processor to not alter the merging basis according to merging rules.

38. The computer program product of claim 24, comprising instructions operable to cause a processor to replace a data block of the merging basis with a data block of the merging partner or add a data block of the merging partner to the data set of the merging basis according to merging rules.

39. The computer program product of claim 24, comprising instructions operable to cause a processor to remove a data block from the merging basis according to merging rules.

40. The computer program product of claim 24, comprising instructions operable to cause a processor to check an update indicator of the merging basis and to cancel the merging of the data sets if the update indicator is set to delete.

41. The computer program product of claim 24, comprising instructions operable to cause a processor to check an update indicator of the merging partner and wherein to cancel the merging of the data sets if the update indicator is set to delete.

42. The computer program product of claim 24, comprising instructions operable to cause a processor to check a compatibility of the merging partner with the merging basis based on particular data within the data sets and to cancel the merging of the data sets if the data sets are incompatible.

43. The computer program product of claim 24, comprising instructions operable to cause a processor to define merging tasks determining the status of the merging basis and the merging partner or the relationship of the merging basis and the merging partner to each other.

44. The computer program product of claim 24, comprising instructions operable to cause a processor to:
define merging tasks determining the status of the merging basis and the merging partner or the relationship of the merging basis and the merging partner to each other,
assign merging rules to merging tasks, and
merge the merging partners with the merging basis according to the assignment of merging rules to merging tasks into a single data set.

45. The computer program product of claim 24, comprising instructions operable to cause a processor to define the determining of the compatibility of the merging partner and the merging basis can involve the product types, the object families, or the change orders of the merging partner and the merging basis.

46. A computer program product for merging data sets of a first data base with data sets of a second data base of a data management system with a computer program comprising instructions operable to cause a processor to:
- determine one data set as a merging basis;
- match data from the first and second data bases to identify matching data sets;
- create a list of matching data sets;
- determine data sets within the list as merging partners;
- check a compatibility of the merging partner with the merging basis based on particular data within the data sets; and
- merge the merging partners with the merging basis into a single data set based on the compatibility check, wherein the merging of the data sets are cancelled when the data sets are incompatible and wherein the single data set can be accessed by a user.

47. A data structure associated with a computer readable medium, wherein the data structure can be altered by a computer executing instructions that provide a method for merging data sets of a first data base with data sets of a second data base of a data management system, the method comprising:
- identifying a data set as a merging basis;
- matching data from the first and second data bases to identify matching data sets, wherein matching data sets can be used to identify a merging partner;
- determining whether the merging partner and the merging basis are compatible; and
- merging the merging partner with the merging basis into a single data set based on the compatibility of the merging partner and the merging basis, wherein the single data set can be accessed by a user.

* * * * *